US007252444B2

(12) United States Patent
Ladouceur

(10) Patent No.: US 7,252,444 B2
(45) Date of Patent: Aug. 7, 2007

(54) SWITCH CONFIGURATION

(75) Inventor: Norman M. Ladouceur, Waterloo (CA)

(73) Assignee: Research In Motion Limited, Waterloo (CA)

( * ) Notice: Subject to any disclaimer, the term of this patent is extended or adjusted under 35 U.S.C. 154(b) by 519 days.

(21) Appl. No.: 10/820,386

(22) Filed: Apr. 8, 2004

(65) Prior Publication Data

US 2005/0227632 A1 Oct. 13, 2005

(51) Int. Cl.
*G06F 3/023* (2006.01)
*H01H 1/10* (2006.01)

(52) U.S. Cl. ........................ 400/472; 200/512; 345/168

(58) Field of Classification Search ..................... None
See application file for complete search history.

(56) References Cited

U.S. PATENT DOCUMENTS

| | | | | |
|---|---|---|---|---|
| 3,767,022 | A * | 10/1973 | Olson | 400/481 |
| 4,500,758 | A | 2/1985 | Guckenheimer | |
| 4,524,249 | A | 6/1985 | Farrell | |
| 4,778,952 | A | 10/1988 | Watkins et al. | |
| 4,803,321 | A | 2/1989 | Lefebvre | |
| 4,845,319 | A | 7/1989 | Watkins et al. | |
| 4,894,498 | A * | 1/1990 | Kagawa et al. | 200/284 |
| 4,918,271 | A | 4/1990 | Deeg | |
| 5,212,356 | A | 5/1993 | English | |
| 5,294,758 | A | 3/1994 | Frankhouse et al. | |
| 5,389,757 | A | 2/1995 | Souliere | |
| 5,457,453 | A * | 10/1995 | Chiu et al. | 341/22 |
| 6,080,941 | A | 6/2000 | Yokobori | |
| 6,268,578 | B1 | 7/2001 | Nakai | |
| 6,525,278 | B2 | 2/2003 | Villain et al. | |
| 6,670,562 | B2 | 12/2003 | Kaneko | |
| 7,067,757 | B1 * | 6/2006 | Chadha | 200/512 |
| 7,084,359 | B1 * | 8/2006 | Konno | 200/1 B |
| 2003/0098853 | A1 | 5/2003 | Ladouceur et al. | |
| 2003/0153355 | A1 * | 8/2003 | Warren | 455/557 |

FOREIGN PATENT DOCUMENTS

| | | |
|---|---|---|
| DE | 36 31 428 A1 | 3/1988 |
| EP | 1 211 590 A1 | 6/2002 |
| EP | 04008613.4-2214 | 9/2004 |
| FR | 2 534 413 A1 | 4/1984 |

* cited by examiner

*Primary Examiner*—Daniel J. Colilla
(74) *Attorney, Agent, or Firm*—Jones Day; Krishna K. Pathiyal; Robert C. Liang

(57) ABSTRACT

A switch configuration for use with a keyboard comprises a plurality of support structures positioned adjacent each other in spaced relation and a plurality of dome switches, with at least one dome switch being coupled to each of the plurality of support structures. A keyboard and mobile communication device incorporate the switch configuration.

15 Claims, 4 Drawing Sheets

SWITCH CONFIGURATION

FIELD

This technology relates to a switch configuration for an electronic device. In particular, the technology concerns a switch configuration for a handheld mobile communication device.

BACKGROUND

Mobile communication devices that include a combined text-entry keyboard and a telephony keyboard are known. Examples of such mobile communication devices include mobile stations, cellular telephones, wireless personal digital assistants (PDAs), two-way paging devices, and others. Combining a traditional-style text-entry keyboard (e.g., a QWERTY-style keyboard) with a traditional-style telephony keyboard on the same mobile communication device typically involves undesirable ergonomic and/or intuitive user interface compromises. The size of the keyboard is often limited by the size of the device, making the keyboard more difficult to use.

Known mobile communication devices utilize keyboards that are associated with dome switches in order to enter characters into the device. Typically, each key in the keyboard is coupled to a single dome switch, which is positioned directly beneath the respective key. Depression of a key to activate a dome switch results in a certain tactile response from the switch. Dome switches, such as a 5 mm dome switch, are currently limited in terms of their spacing by mechanical limitations, such as the footprint of the switch. Because of these limitations, dome switches must be spaced from each other a given distance in order to operate properly. In a known mobile communication device, such as communication devices manufactured by Research in Motion Limited, a certain feel is associated with key stroke entry on the keyboard. This feel is provided, in large part, due to the tactile response the user receives from the dome switch. It is desirable to maintain this feel by utilizing the same dome switches in newer devices. However, because of the mechanical limitations of dome switches, it is often difficult to maintain this feel when a smaller device, or smaller keyboard, is desired.

SUMMARY

In accordance with the teachings described herein, a switch configuration for use with a keyboard comprises at least one first support structure and at least one second support structure. The first support structure has a plurality of apertures disposed therethrough. The second support structure is positioned adjacent the first support structure. A plurality of first dome switches are positioned on the first support structure in spaced relation to one another and a plurality of second dome switches are positioned on the second support structure in spaced relation to one another. Each of the second dome switches is aligned with one of the plurality of apertures in the first support structure.

The first support structure may be positioned above and spaced from the second support structure in substantially parallel relation. The first dome switches may be arranged in an evenly spaced grid on the first support structure and the second dome switches may be arranged in an evenly spaced grid on the second support structure. Alternatively, the first and second dome switches may be arranged in a grid that is unevenly spaced. The first support structure may be a printed circuit board and the second support structure may be a printed circuit board. At least one spacer may be positioned between the first support structure and the second support structure.

In another embodiment, a keyboard comprises the switch configuration, discussed above, and a plurality of keys. Each key has an upper contact surface and a lower surface. An actuator extends outwardly from the lower surface toward the first and second support structures. Each actuator is associated with one of the plurality of dome switches.

The plurality of keys may include a first subset of keys associated with the first dome switches and a second subset of keys associated with the second dome switches. The actuator may be a post that extends downwardly from the lower surface of each key. Each post associated with the first subset of keys has a first length and each post associated with the second subset of keys has a second length. The second length may be greater than the first length. At least one of the actuators extends through the apertures disposed in the first support structure for association with the second dome switches. In addition, each actuator may be associated with a single dome switch, with some of the actuators being associated with the first dome switches and some of the actuators being associated with the second dome switches. The actuators may have a length configured to activate the respective first or second dome switches upon depression of the key upper contact surface.

The plurality of keys of the keyboard may include at least 26 keys, with the keys being associated with alphabetic characters "A-Z". In addition, the plurality of keys may be further associated with numbers "0-9".

In another embodiment, a mobile communication device comprises a housing having an outer surface and an inner surface, a display, and the keyboard, discussed above. Each of the keys of the keyboard is associated with the outer surface of the housing and the first and second support structures and first and second dome switches are associated with the inner surface of the housing.

In yet another embodiment, a switch configuration for use with a keyboard comprises a plurality of support structures positioned adjacent each other in spaced relation and a plurality of dome switches. At least one dome switch is coupled to each of the support structures.

The support structures may be arranged vertically in parallel relation to one another and may have a left side and a right side. The plurality of dome switches may be each positioned on a right side of the respective support structures. The plurality of support structures may be printed circuit boards.

In a further embodiment, a mobile communication device comprises a housing, a display, a keyboard comprising a plurality of keys, and the switch configuration discussed above. Each of the dome switches is associated with at least one of the keys.

Each of the plurality of keys may comprise an upper contact surface and a lower surface, with an actuator coupled to the lower surface and extending toward the dome switches. The actuator may be a post with a ball coupled to the end of the post. The ball is configured for actuation of the associated dome switch when the key is depressed.

BRIEF DESCRIPTION OF THE DRAWING FIGURES

DETAILED DESCRIPTION

Figure 1:
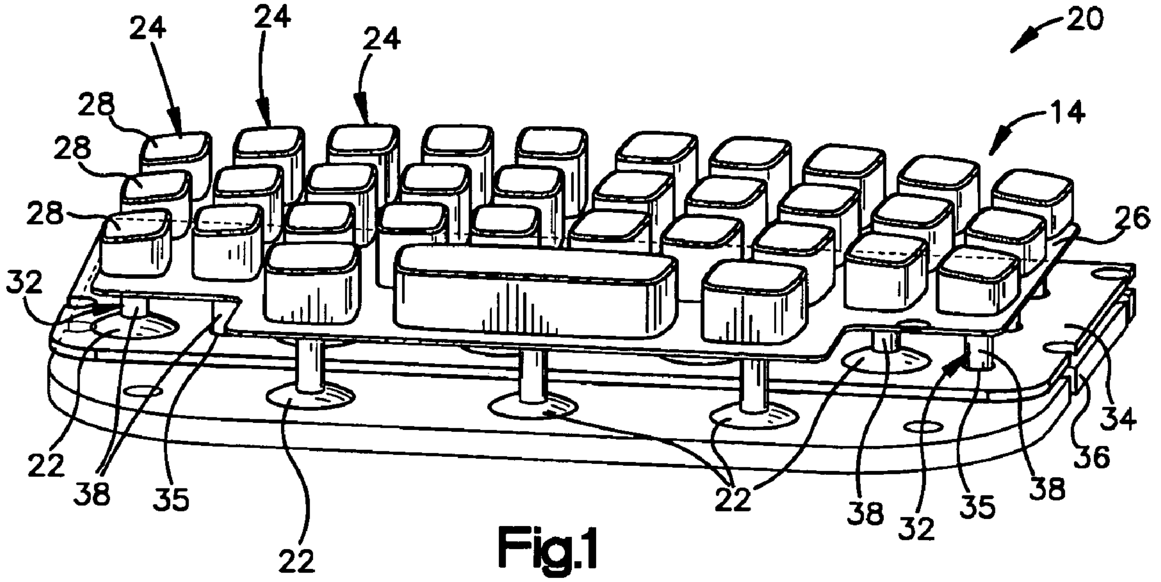
FIG. 1 is a perspective side view of a keyboard incorporating an example switch configuration.
Figure 2:
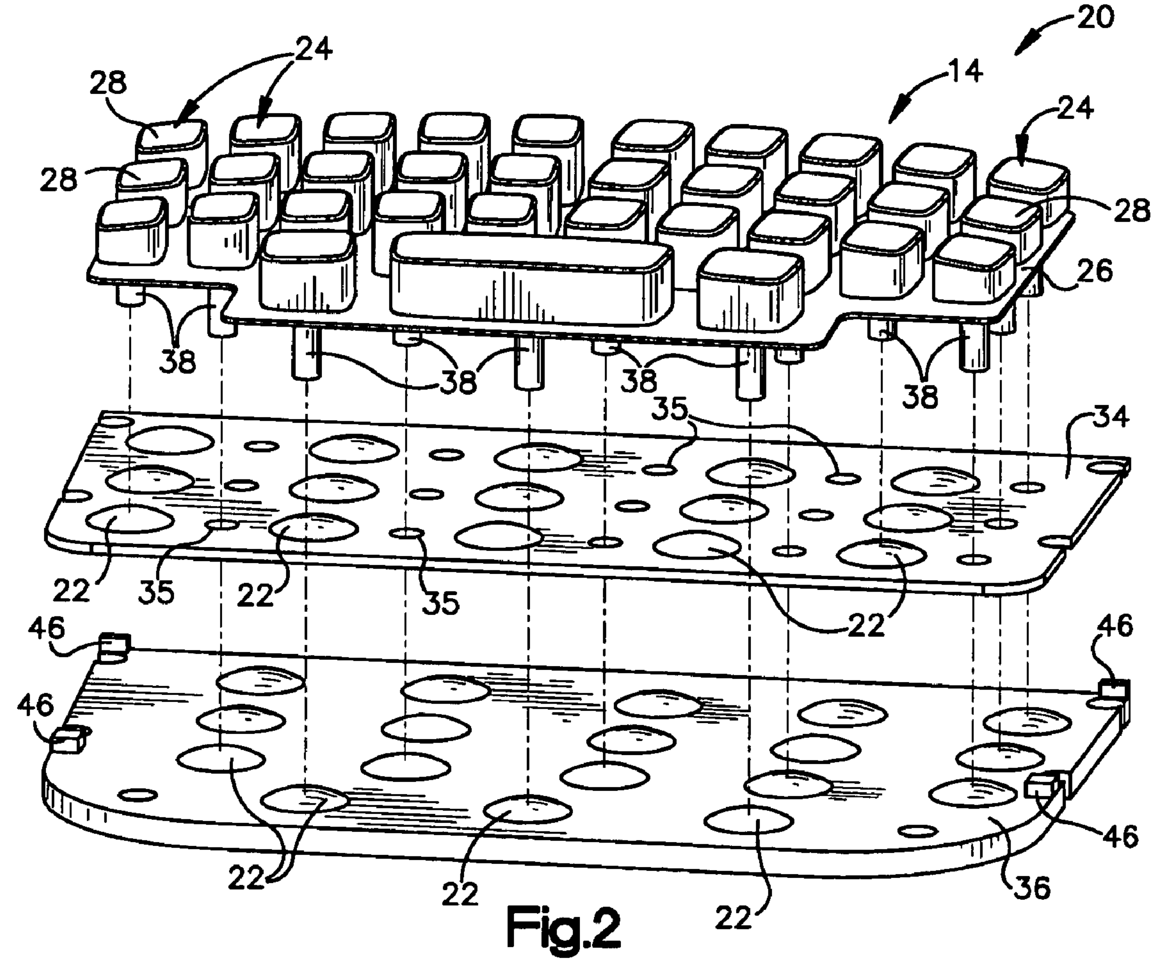
FIG. 2 is an elevated and exploded perspective view of the keyboard of FIG. 1.

With reference now to the drawings, an example switch configuration 20 is shown in FIGS. 1-5. The example switch configuration 20 is designed for use with a keyboard 14, such as a keyboard 14 that is utilized on a mobile communication device 10. Example mobile communication devices 10 that may utilize the example switch configuration 20 include small, hand-held electronic mobile communication devices, such as mobile stations, cellular telephones, wireless personal digital assistants (PDAs), personal information managers (PIMs), two-way paging devices, and others. Any type of mobile communication device 10 may be utilized with the example switch configuration 20.

In order to keep the form factor of the mobile communication device 10 small enough to be worn on the body of a user, the keyboard 14 must be small. To this point, keyboard size has been directed in part by the size of the dome switch 22 that is utilized beneath the key 24. Dome switches 22 are available in various sizes. For example, a preferred dome switch size is 5 mm. A 5 mm dome switch 22 will provide a certain tactile feedback and feel to the user of the keyboard 14 when a key is depressed. When a differently sized switch 22 is used, such as a smaller switch, the tactile feedback and feel to the user will be different. It is desirable to maintain the same feel and tactile feedback for the user of mobile communication devices 10 of the same brand, such as the RIM Blackberry devices. Thus, it is desirable to maintain the same size dome switch 22 with a keyboard 14 between different models of communication devices 10 within a common brand, and, at the same time, reduce the size of the keyboard 14 such that smaller devices 10 are possible. The provision of the example switch configuration 20 allows for a full size keyboard that takes up less width and height on the housing 26 of the communication device 10, allowing for placement of a full-sized keyboard on a cellular telephone, for example. The example switch configuration 20 may also be used on reduced key alphanumeric keyboards, among other keyboards, without limitation.

FIGS. 1-5 depict a first embodiment of the example switch configuration 20 and keyboard 14. The keyboard 14 includes a plurality of keys 24 arranged in a grid on the housing 26 of the mobile communication device 10. Each of the keys 24 includes an upper surface 28 that is designed for contact with the fingers or thumbs of a user. The keys 24 also include a lower surface 30. An actuator 32, such as a lever or post, extends downwardly from the lower surface 30. The switch configuration 20 includes a first support structure 34 and a second support structure 36. The first support structure 34 is positioned above and adjacent to the second support structure 36 in spaced relation. If desired, one or more spacers 46 may be positioned between the first and second support structures 34, 36. In addition, the first and second support structures 34, 36 are preferably parallel to one another. A plurality of apertures 35 extend through the surface of the first support structure 34 and are provided to allow the keys 24 of the keyboard 14 to contact the second support structure 36 through the first support structure 34.

In a preferred embodiment, each support structure 34, 36 is a printed circuit board and a plurality of dome switches 22 are positioned on the surface of each support structure. The dome switches 22 are positioned on a side of the support structure 34, 36 that faces the lower surface 30 of the keys 24. The number of dome switches 22 is preferably equal to the number of keys, such that each key 24 is associated with a single dome switch 22. In an alternative embodiment, which is not shown, more than one key 24 may be associated with each dome switch 22 and a predictive text or other software program or hardware may be utilized to determine the desired entry.

The dome switches 22 are arranged in a grid pattern on each support structure 34, 36 and are spaced relative to one another by at least the minimum spacing required by the manufacturer of the dome switch 22. The dome switches 22 may be evenly spaced on the support structures 34, 36, or may be unevenly spaced. The arrangement of the dome switches 22 on the support structures 34, 36 will depend in part upon the arrangement of the keys 24 on the keyboard 14. Dome switches 22 are available from such manufacturers as Panasonic, Snaptronic, and ITT, among others.

Figure 3:
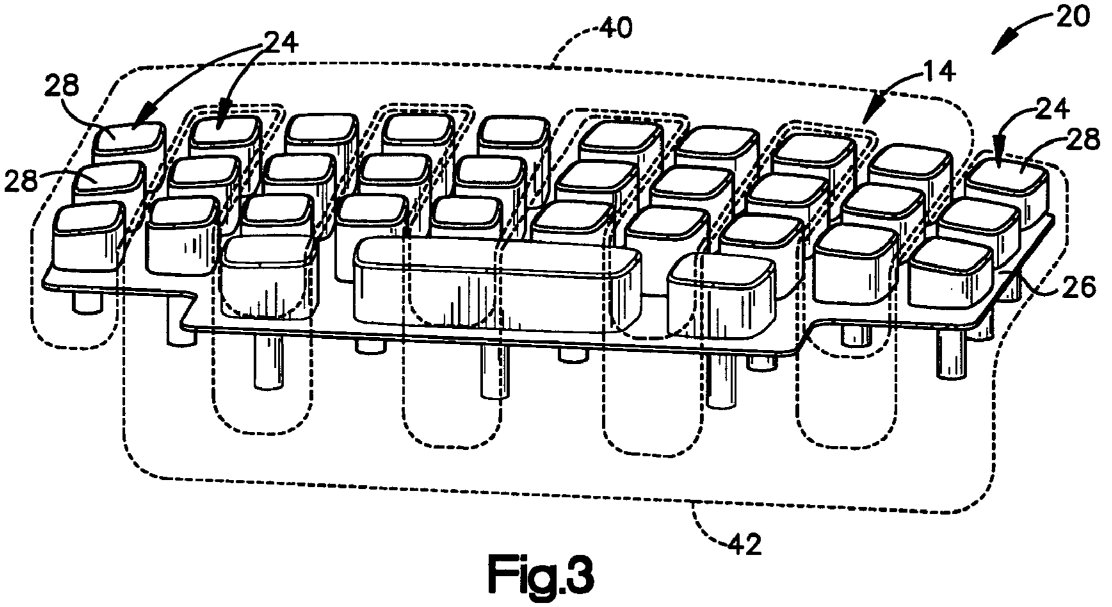
FIG. 3 is an exploded perspective side view of the keyboard of FIG. 1.
Figure 4:
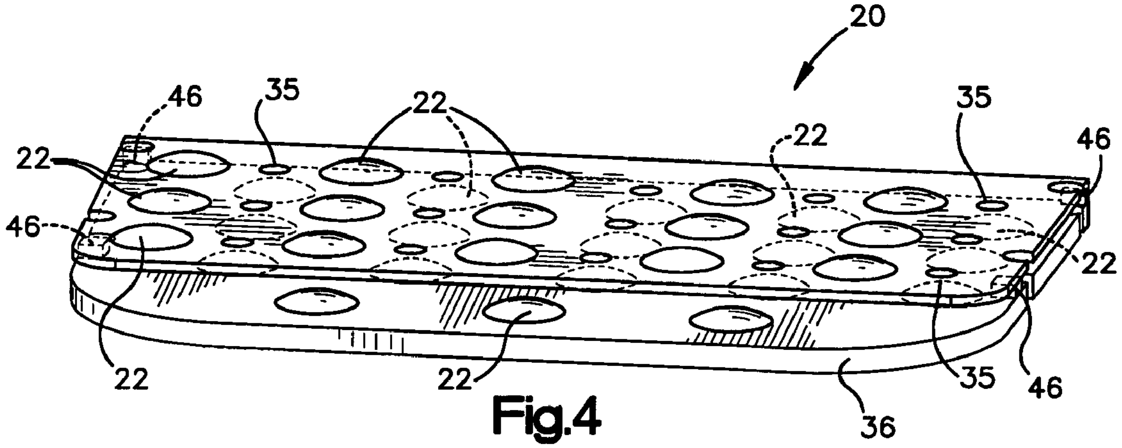
FIG. 4 is a perspective view of the example switch configuration.
Figure 5:
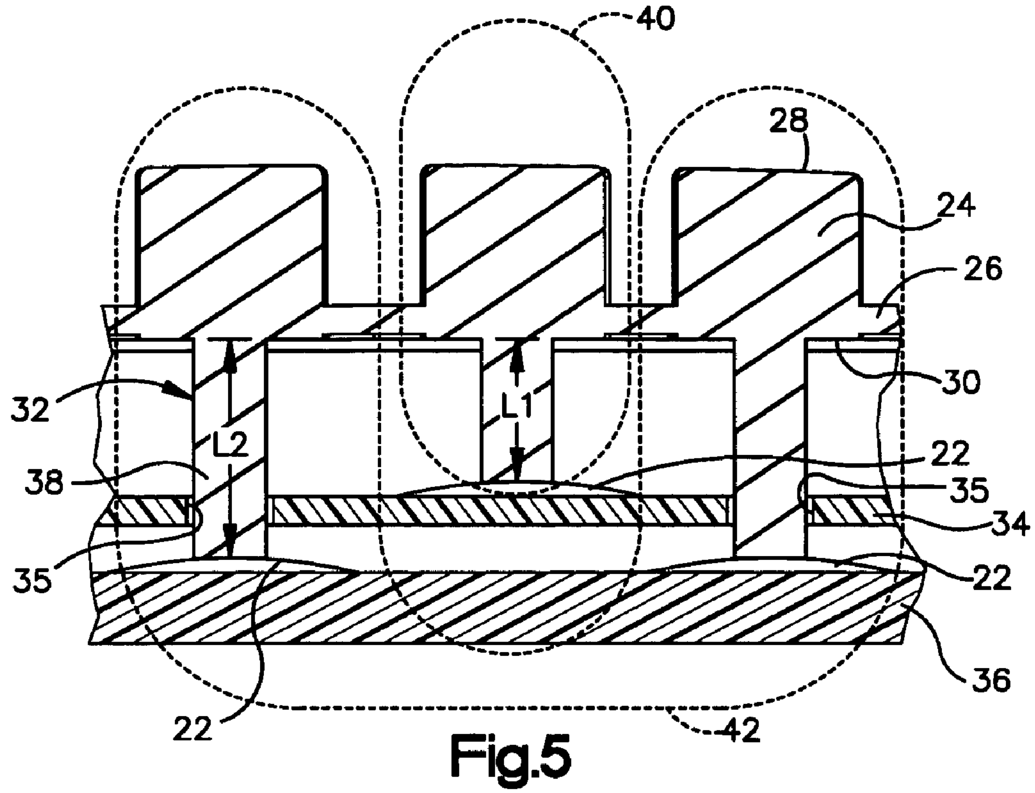
FIG. 5 is a partial cross-sectional view of the keyboard of FIG. 1.

As shown in FIGS. 3-5, the actuator 32 for each of the keys 24 is a post 38. Some of the posts 38 are part of a first subset of keys 40 and have a first length L1, shown best in FIG. 5. These posts 38 are referred to herein as first posts. Some of the posts 38 are part of a second subset of keys 42 and have a second length L2. These posts 38 are referred to herein as second posts. The first posts are configured to actuate dome switches 22 positioned on the first support structure 34 and the second posts are configured to actuate dome switches 22 positioned on the second support structure 36. Each dome switch 22 on the second support structure 36 is aligned with one of the apertures 35 of the first support structure 34 and the second posts extend through the apertures 35 to engage the dome switches 22 on the second support structure 36.

The first subset of keys 40 may be arranged in alternating rows, as shown in FIG. 3, and the second subset 42 may be arranged in alternating rows of the keyboard 14. Alternatively, the first subset of keys 40 may be arranged in alternating columns and the second subset of keys 42 may be arranged in alternating columns of the keyboard 14. Other arrangements of the first and second subsets 40, 42 may also be utilized depending upon the placement and arrangement of the keys 24.

As is shown in FIGS. 3-4, the dome switches 22 on the first support structure 34 are staggered relative to the dome switches 22 on the second support structure 36 such that the dome switches 22 on the first support structure 34 align with the first posts of the first subset of keys 40 and the dome switches 22 on the second support structure 36 align with the second posts of the second subset of keys 42. The travel distance for each of the keys 24 is also preferably the same, and can be modified by changing the lengths of the posts 38. In operation, the user depresses a key 24 and receives the same tactile feedback and feel from each of the keys 24, regardless of whether a dome switch 22 on the first or the second support structure 34, 36 is activated.

FIG. 5 depicts a cross-sectional view of a portion of the keyboard shown in FIGS. 1-4. The keys 24 are shown as being integral with the housing 26. This may be accomplished by utilizing a rubber surface for the keys and housing, such that each key 24 and the associated housing in the vicinity of the key is flexible and can move when the key 24 is depressed. Alternatively, as shown in FIG. 6, the keys 24 may be separate from the housing 26, and may be supported in opening defined in the housing 26.

While the above-described embodiment of the switch configuration is shown and described as having two support structure layers, more than two support structure layers may be utilized, as long as each of the upper layers includes apertures through which posts of the actuators may extend to actuate dome switches positioned on the other layers.

Figure 6:
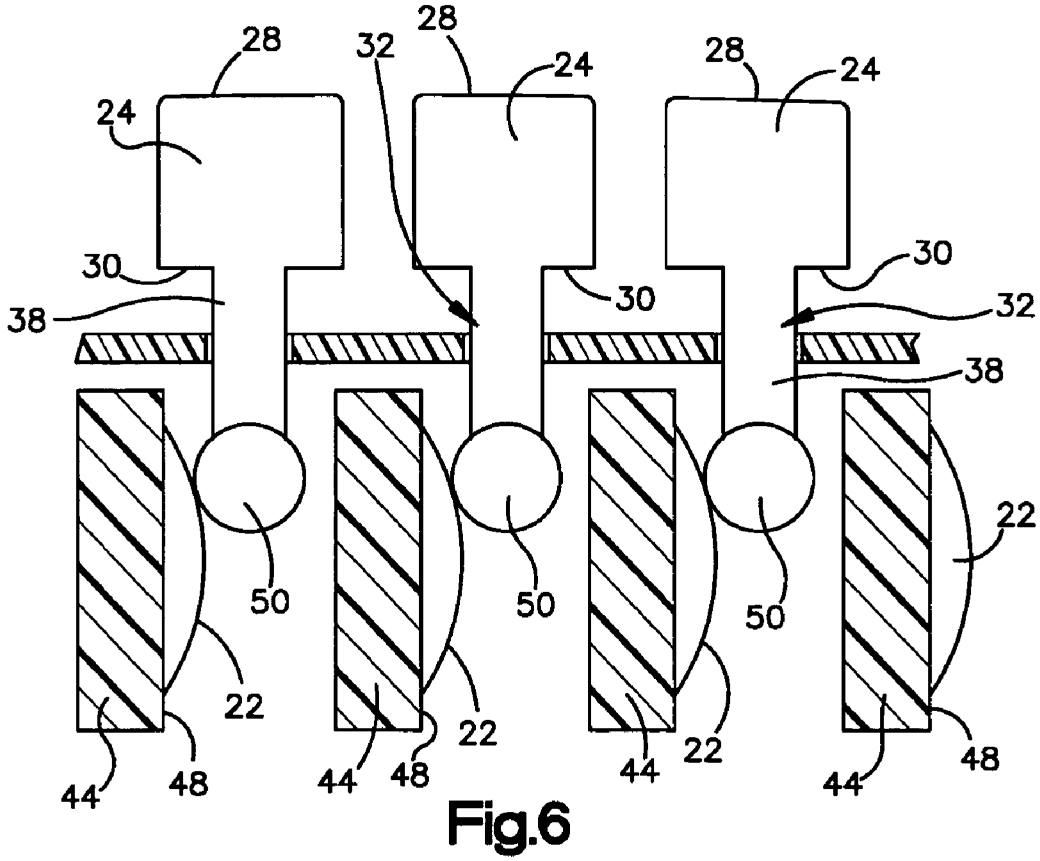
FIG. 6 is a partial cross-sectional view of an alternative embodiment of a keyboard incorporating an example switch configuration.

FIG. 6 is an alternative embodiment of the example switch configuration 20. In this embodiment, a plurality of support structures 44 are positioned in parallel, spaced relation. Each of the support structures 44 is arranged vertically beneath the housing 26 of the mobile communication device 10. One or more spacers 46 may be positioned between each support structure 44 in order to maintain a preferred distance between the support structures. 44. At least one dome switch 22 is positioned on each support structure 44, and, preferably, multiple dome switches 22 are positioned on each support structure 44. The support structures 44 are preferably printed circuit boards.

In a keyboard 14 having ten columns and four rows of keys 24, ten support structures 44 may be arranged longitudinally or four support structures 44 may be arranged horizontally. In a preferred embodiment, a dome switch 22 is associated with each key 24. The dome switches 44 are arranged vertically on a side wall 48 of the support structures 44. As shown in FIG. 6, the dome switches 22 may all be positioned on the same side of the support structures 44, such as the right side, as shown in FIG. 6. Alternatively, the dome switches 22 may be positioned in opposed relation, so that they face one another, or arranged randomly, with some facing one direction and other's facing another direction.

The keys 24 shown in FIG. 6 each have an upper surface 28 that is contacted by a user to actuate the switch by pressing downwardly. Each key 24 also has a lower surface 30 and an actuator 32 is attached to each lower surface 30 and extends downwardly toward the dome switches 22. The actuator 32 shown is a post 38 with a ball 50 positioned at the base of the post 38. When the key 24 is depressed, the ball 50 presses against the dome switch 22 to actuate the switch. The support structures 44 are spaced at least a distance equal to or greater than the diameter of the ball 50. Other types of actuators may alternatively be used with this embodiment, such as mechanical or other linkages, or otherwise.

It is preferred that the keys 24 be positioned at an orientation and in a particular shape that attempts to maximize the surface area of the thumb hitting the keys 24 and to provide the user with a comfortable position of the hands for data input. Also, the orientation should preferably encourage input by the thumbs, which has been discovered to be faster and more accurate in small hand-held electronic devices than touch-typing or "hunting and pecking" typing. An example of preferred key shapes and orientations is described in U.S. Pat. No. 6,278,442 and U.S. Design Pat. No. D416,256, the disclosures of which are hereby incorporated by reference in their entirety.

In addition to hardware features that encourage optimal data entry through the use of thumbs, software features that are designed to minimize keystrokes and aid data entry may also be provided. An example of a mobile communication device having a keyboard assembly with hardware and software associated with key entry is described in U.S. patent application Ser. Nos. 09/967,537; 09/976,536; 10/302,242; and U.S. Pat. No. 6,278,442, the disclosures of which are incorporated herein by reference in their entirety.

Figure 7:
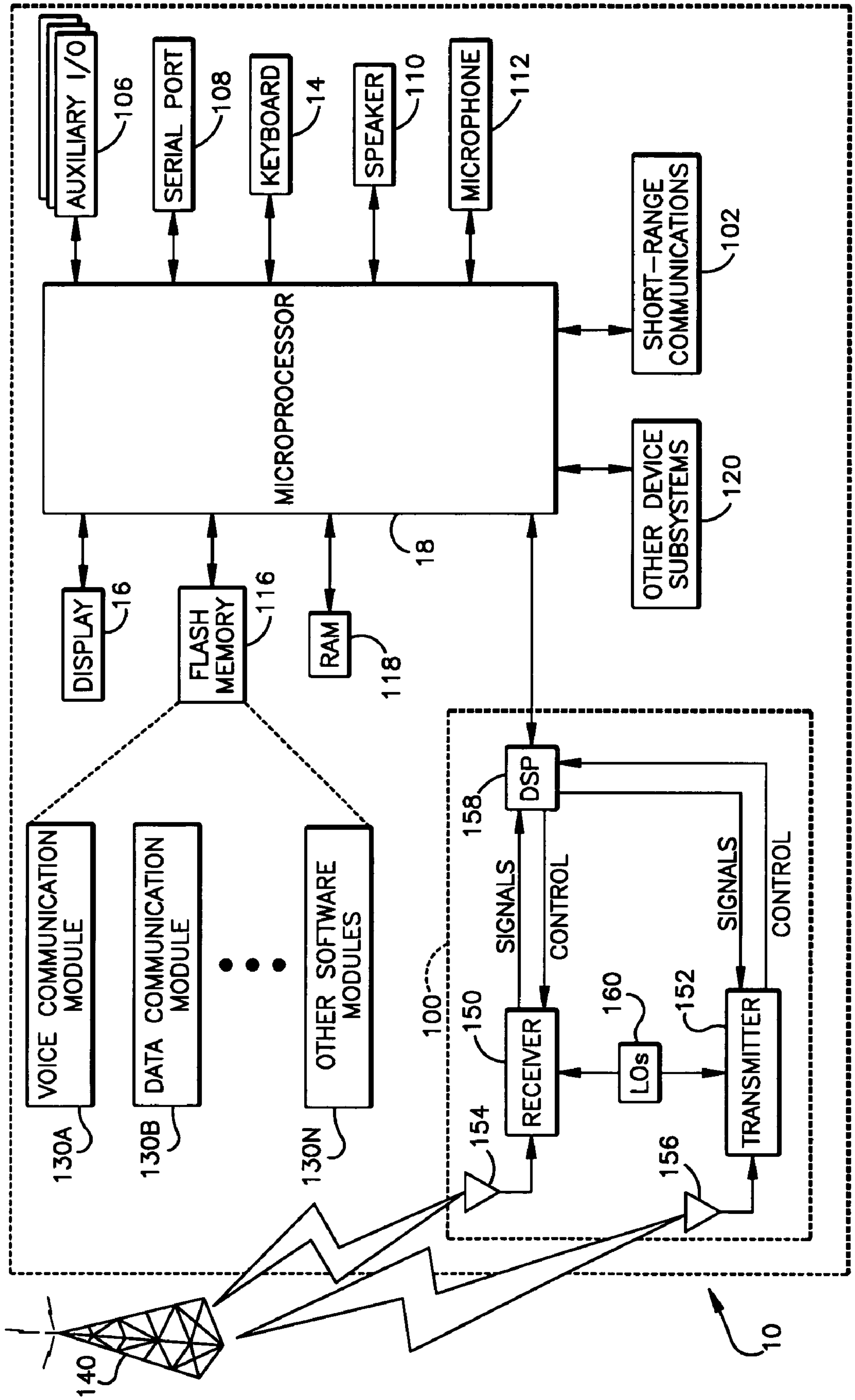
FIG. 7 is a block diagram illustrating an example mobile communication device system.

Handheld mobile communication devices 10 include similar features, such as a housing 26, a keyboard 14 and a display 16. The display 16 is preferably a full graphic LCD. Other types of output devices may alternatively be utilized. A processing device 18, which is shown schematically in FIG. 7, is contained within the housing 26 and is coupled between the keyboard 14 and the display 16. The processing device 18 controls the operation of the display 16, as well as the overall operation of the mobile communication device 10, in response to actuation of keys on the keyboard 14 by the user.

The housing 26 may be elongated vertically, or may take on other sizes and shapes. The keyboard may include a mode selection key, or other hardware or software for switching between text entry and telephony entry.

In addition to the processing device 18, other parts of the mobile communication device 10 are shown schematically in FIG. 7. These include a communications subsystem 100; a short-range communications subsystem; the keyboard 14 and the display 16, along with other input/output devices 106, 108, 110 and 112; as well as memory devices 116, 118 and various other device subsystems 120. The mobile communication device 10 is preferably a two-way RF communication device having voice and data communication capabilities. In addition, the mobile communication device 10 preferably has the capability to communicate with other computer systems via the Internet.

Operating system software executed by the processing device 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM) 118. Communication signals received by the mobile communication device may also be stored to the RAM 118.

The processing device 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is incorporated herein by reference.

Communication functions, including data and voice communications, are performed through the communication subsystem 100, and possibly through the short-range communications subsystem. The communication subsystem 100 includes a receiver 150, a transmitter 152, and one or more antennas 154, 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile communication device 10 is intended to operate. For example, a mobile communication device 10 may include a communication subsystem 100 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile communication device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile communication device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processing device 18. The received signal is then further processed by the processing device 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem enables communication between the mobile communication device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

The keys 24 may be toggle keys or non-toggle keys, if desired. Additional or fewer rows and columns, above and beyond the number shown herein, may also be provided to position functional and other keys, if desired. Furthermore, the keys may be aligned in columns, or may be staggered, in some embodiments. Rows and/or columns may be straight, curved, or otherwise. In addition, other shaped keys may be utilized. In a preferred embodiment, the keys are oval shaped and positioned at an angle.

The word "substantially" is used herein as an estimation term.

While various features of the claimed embodiments are presented above, it should be understood that the features may be used singly or in any combination thereof. Therefore, the claimed embodiments are not to be limited to only the specific embodiments depicted herein. Further, it should be understood that variations and modifications may occur to those skilled in the art to which the claimed embodiments pertains. The embodiments described herein are exemplary. The disclosure may enable those skilled in the art to make and use embodiments having alternative elements that likewise correspond to the elements recited in the claims. The intended scope may thus include other embodiments that do not differ or that insubstantially differ from the literal language of the claims. The scope of the example embodiments is accordingly defined as set forth in the appended claims.

What is claimed is:

1. A switch configuration for use with a keyboard comprising:

at least one first support structure having a plurality of apertures disposed therethrough;

at least one second support structure positioned adjacent the first support structure;

a plurality of first dome switches positioned on the first support structure in spaced relation to one another;

a plurality of second dome switches positioned on the second support structure in spaced relation to one another, each of said second dome switches being aligned with one of the plurality of apertures in the first support structure.

2. The switch configuration of claim 1, wherein the first support structure is positioned above and spaced from the second support structure in substantially parallel relation.

3. The switch configuration of claim 1, wherein the first dome switches are arranged in an evenly spaced grid on the first support structure and the second dome switches are arranged in an evenly spaced grid on the second support structure.

4. The switch configuration of claim 1, wherein the first support structure is a printed circuit board and the second support structure is a printed circuit board.

5. The switch configuration of claim 1, further comprising at least one spacer positioned between the first support structure and the second support structure.

6. A keyboard comprising:

the switch configuration of claim 1; and a plurality of keys, with each key having an upper contact surface and a lower surface, with an actuator extending outwardly from the lower surface toward the first and second support structures, wherein each actuator is associated with one of the plurality of dome switches.

7. The keyboard of claim 6, wherein the plurality of keys includes a first subset of keys associated with the first dome switches and a second subset of keys associated with the second dome switches.

8. The keyboard of claim 6, wherein the actuator is a post that extends downwardly from the lower surface of each key.

9. The keyboard of claim 8, wherein each post associated with the first subset of keys has a first length and each post associated with the second subset of keys has a second length, and the second length is greater than the first length.

10. The keyboard of claim 6, wherein at least one of the actuators extends through the apertures disposed in the first support structure for association with the second dome switches.

11. The keyboard of claim 10, wherein each actuator is associated with a single dome switch, with some of the actuators being associated with the first dome switches and some of the actuators being associated with the second dome switches.

12. The keyboard of claim 10, wherein the actuators have a length configured to activate the respective first or second dome switches upon depression of the key upper contact surface.

13. The keyboard of claim 6, wherein the plurality of keys includes at least 26 keys, said keys being associated with alphabetic characters "A-Z".

14. The keyboard of claim 13, wherein the plurality of keys is further associated with numbers "0-9".

15. A mobile communication device comprising:

a housing having an outer surface and an inner surface;

a display; and the keyboard of claim 6, wherein each of the keys is associated with the outer surface of the housing and the first and second support structures and first and second dome switches are associated with the inner surface of the housing.

* * * * *